United States Patent
Schreckengast et al.

(10) Patent No.: US 7,225,174 B2
(45) Date of Patent: *May 29, 2007

(54) INVESTMENT ANALYSIS TOOL AND SERVICE FOR MAKING INVESTMENT DECISIONS

(75) Inventors: James O. Schreckengast, Fort Collins, CO (US); Claus Skaanning, Dronninglund (DK); Douglas M. Gilbert, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 665 days.

This patent is subject to a terminal disclaimer.

(21) Appl. No.: 10/078,971

(22) Filed: Feb. 19, 2002

(65) Prior Publication Data

US 2002/0128943 A1    Sep. 12, 2002

Related U.S. Application Data

(63) Continuation-in-part of application No. 09/758,891, filed on Jan. 11, 2001, now Pat. No. 6,879,973, which is a continuation-in-part of application No. 09/353,727, filed on Jul. 14, 1999, now Pat. No. 6,535,865.

(51) Int. Cl.
G06F 17/00    (2006.01)
G06N 5/00    (2006.01)

(52) U.S. Cl. ...................................................... 706/45
(58) Field of Classification Search .................. 706/45; 705/36
See application file for complete search history.

(56) References Cited

U.S. PATENT DOCUMENTS

| 4,346,442 A | 8/1982 | Musmanno |
| 4,674,044 A | 6/1987 | Kalmus |
| 4,752,877 A | 6/1988 | Roberts et al. |
| 5,133,046 A | 7/1992 | Kaplan |
| 5,596,712 A | 1/1997 | Tsuyama et al. |
| 5,701,400 A * | 12/1997 | Amado ........................ 706/45 |
| 5,715,374 A | 2/1998 | Heckerman et al. |
| 5,761,442 A | 6/1998 | Barr et al. |

(Continued)

FOREIGN PATENT DOCUMENTS

DE    4305522    9/1994

(Continued)

OTHER PUBLICATIONS

K.D. Meyer-Gramann, S. Dieter; "Dino, ein Softwarewerkzeug . . . ,"Ki-94-Anwendungen der Kunstlichen Intellegenz, 18. Fachtagung fur Kunstl Intelligenz, 22/23, Sep. 1994.

(Continued)

*Primary Examiner*—Anthony Knight
*Assistant Examiner*—Michael B. Holmes

(57) ABSTRACT

A decision support system supports investment decisions. The decision support system includes a decision support engine and a Bayesian network. The Bayesian network is traversed by the decision support engine. The Bayesian network includes an investment decision node, potential investment nodes, and information nodes. The investment decision node identifies an investment decision. The potential investment nodes identify potential investments. The information nodes identify information to be obtained. The information to be obtained is matched to potential investments. Reliability of the information is estimated, for example, with the help of domain experts.

4 Claims, 7 Drawing Sheets

U.S. PATENT DOCUMENTS

| | | | |
|---|---|---|---|
| 5,784,616 | A | 7/1998 | Horvitz |
| 5,812,758 | A | 9/1998 | Laureanno |
| 5,845,272 | A | 12/1998 | Morjaria et al. |
| 5,873,071 | A | 2/1999 | Ferstenberg et al. |
| 6,078,901 | A * | 6/2000 | Ching .......................... 705/35 |
| 6,807,537 | B1 * | 10/2004 | Thiesson et al. ............... 706/52 |

FOREIGN PATENT DOCUMENTS

| | | |
|---|---|---|
| EP | 0410632 | 1/1991 |
| EP | 0616288 | 9/1994 |

OTHER PUBLICATIONS

K.D. Meyer-Gramann, E.-W. Jungst: "Diagnose von modularen technischen System . . . " F. Puppe, A Gunter (Hrsg.): 17-19, Feb. 1993.

D. Heckerman, J.S. Breese, K. Rommelse: "Decision-Theoretic Troubleshooting," Comm. ACM vol. 38 No. 3, 1995, pp. 49-57.

J.S. Breese, D. Heckerman: "Decision-Theoretic Troubleshooting: A Framework . . . ," Proceed. 12th Conf. on Uncertainty in Artificial Intelligence, 1-4. Aug. 1996, pp. 124-132.

J.-F. Huard et al. "Fault Isolation based on Decision-Theoretic Troubleshooting," Tech. Rpt. 442-96-08, Ctr. for Telecomm. Rsch., Columbia Univ. NY, NY 1996.

D. Heckerman, J.S. Breese, K. Rommelse: "Troubleshooting under Uncertainty," Proc. 5th Int. Wkshp. on Principles of Diagnostics, 1994, pp. 121-130.

H. Hajji et al. "Decision-Theoretic Diagnosis-Repair Planning Using Bayesian Networks," Proc. 12th Annual Conf. Jap. Soc. of Artificial Intell., Tokyo. Jun. 1998, pp. 256-257.

* cited by examiner

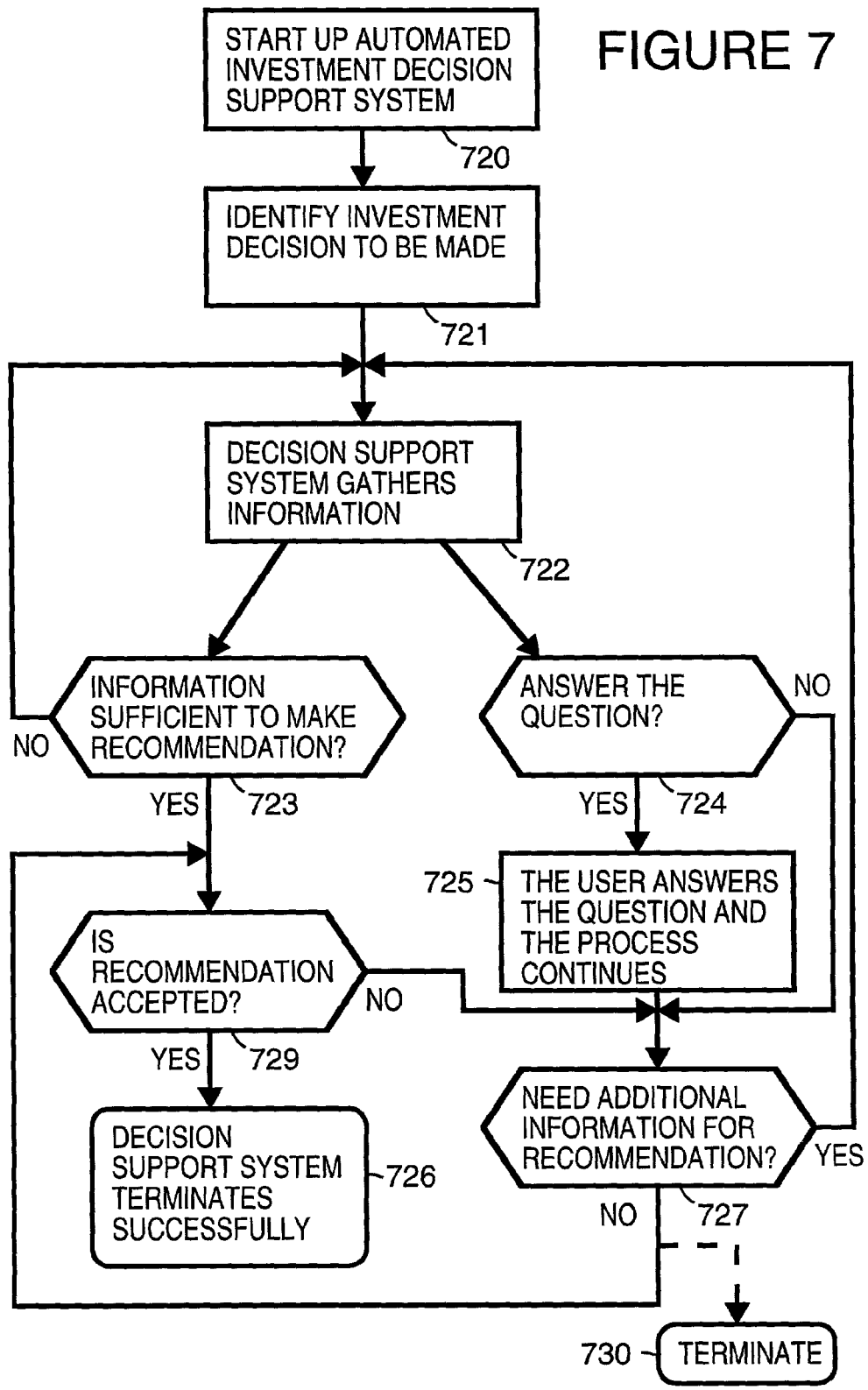

INVESTMENT ANALYSIS TOOL AND SERVICE FOR MAKING INVESTMENT DECISIONS

RELATED APPLICATIONS

This application is related by subject matter to the following patent applications: U.S. patent application Ser. No. 09/388,891 entitled, "Authoring Tool For Bayesian-Network Troubleshooters" having inventor Claus Skaaning, and a filing date of Sep. 2, 1999; U.S. patent application Ser. No. 09/866,411 entitled, "Model Selection For Decision Support System" having inventors Claus Skaaning and James O. Schreckengast, and a filing date of May 26, 2001; U.S. patent application Ser. No. 09/919,153 entitled, "Proprietary Information Utility" having inventors James O. Schreckengast and Anton I. Engberg and a filing date of Jul. 31, 2001; and U.S. patent application Ser. No. 09/644,117 entitled, "Validation Of Probabilistic Troubleshooters And Diagnostic Systems," having inventors Claus Skaaning et al. and a filing date of Aug. 22, 2000, now U.S. Pat. No. 6,820,072.

This application is a continuation-in-part of application Ser. No. 09/758,891, filed Jan. 11, 2001 now U.S. Pat. No. 6,879,973 which is a continuation-in-part of application Ser. No. 09/353,727, filed Jul. 14, 1999 now U.S. Pat. No. 6,535,865.

BACKGROUND

The present invention pertains to knowledge-based systems and more particularly pertains to a scaleable investment tools and service for aiding users in making investment decisions based upon fundamental requirments of the individuals wishing to make the financial investments.

Investors often work alone or with investment managers to create an investment portfolio that in theory will provide a high return on investment consistent with a degree of risk that the individual investor is willing to take. In order to achieve what is an optimum investment portfolio, research is performed on fundamentals of particulars stock or on industry sectors, historical price data, price-to-earnings ratios, growth rates and so on. There is currently a very large amount of information available, for instance through the Internet, that aids investors in their task.

Barrons frequently lists what it considers to be the top ten websites for investors (e.g., moneycentral.com, quote.yahoo.com, cbs.marketwatch.com, etc.) all of which provide significant research data and investment tools for investors. What this website exemplifies is a principal problem facing today's investors. Investors using these tools quickly discover that the amount of investment data available today is overwhelming and cannot easily be interpreted or digested even by the more expert investor.

The number of potential investment options available to today's investors is equally daunting. Potential investment products include domestic and foreign stocks, mutual finds, stock options, futures, commodities commodity options, options, real estate finds, real estate investment trusts, currency funds, Treasury instruments, corporate and municipal bonds, futures contracts. etc. Generally, specialized knowledge is required in order to maximize profits when selecting investments as well as when timing purchases and sales. This usually gets into trading strategies and market patterns of which there are probably more opinions on than there are stocks to trade.

Computer systems have been used to aid in making investment decisions. One of their advantages is their ability to manipulate large amounts of numerical data over a relatively short period of time. For example, U.S. Pat. No. 5,761,442 describes using a predictive neural network for selecting a portfolio of securities. Each network is trained using available historical data relating to a corresponding security that is deemed to be "appropriate" by the person operating the system. Other experts in the field have tried applying artificial intelligence to the problem of manipulating financial data, for example, see R. Tripp and J. Lee "Artificial Intelligence in Finance and Investing," 1996.

Bayesian theory is also well suited to predicting outcomes given particular probabilistic data about the factors affecting the desired outcomes. In scientific literature Bayesian networks are referred to by various names: Bayes nets, causal probabilistic networks, Bayesian belief networks or simply belief networks. Loosely defined Bayesian networks are a concise (acyclic) graphical structure for modeling probabilistic relationships among discrete random variables. Bayesian networks are used to efficiently model problem domains containing uncertainty in some manner and therein lies their utility. Since they can be easily modeled on a computer, they are the subject of increasing interest and use in automated decision—support systems, whether for medical diagnosis, automated automotive troubleshooting, or in other areas as mundane as predicting a computer user's likely requirements.

In general, a Bayesian network consists of a set of nodes representing discrete—valued variables connected by arcs representing the causal dependencies between the nodes. A set of conditional probability tables, one for each node, defines the dependency between the nodes and its parents. And, nodes without parents, sometimes called source nodes, have associated therewith a prior marginal probability table. For specific applications the data for the probability tables for all other nodes are provided by what is termed domain experts in whatever field is being modeled. This involves assigning prior probabilities for all nodes without parents, and conditional probabilities for all nodes with parents. In diagnostic Bayesian networks nodes can represent causes, or outcomes of actions and questions. In very large diagnostic Bayesian networks, most of the events are very rare with probabilities in the range of 0.001 to 0.000001. But, since a primary goal of a computer decision support system is to provide likely outcomes of certain actions as accurate as is possible, it is imperative that the domain experts provide probabilistic information that is highly reliable and their best estimate of the situation.

Bayesian networks provide a way to model problem areas using probability theory. The Bayesian network representation of a problem can be used to provide information on a subset of variables given information on others. A Bayesian network consists of a set of variables (nodes) and a set of directed edges (connections between variables). Each variable has a set of mutually exclusive states. The variables together with the directed edges form a directed acyclic graph (DAG). For each variable $v$ with parents $w_1, \ldots, w_n$, there is defined a conditional probability table $P(v|w_1, \ldots, w_n)$. Obviously, if v has no parents, this table reduces to the marginal probability $P(v)$.

Bayesian networks have been used in many application domains with uncertainty, such as medical diagnosis, pedigree analysis, planning, debt detection, bottleneck detection, etc. However, one of the major application areas not heretofore studied is financial investment since Bayesian networks are well suited to decision support. Financial/investment decision support analysis lends itself nicely to the modeling techniques of Bayesian networks.

SUMMARY OF THE INVENTION

In accordance with a preferred embodiment of the present invention, a decision support system supports investment decisions. The decision support system includes a decision support engine and a Bayesian network. The Bayesian network is traversed by the decision support engine. The Bayesian network includes an investment decision node, potential investment nodes, and information nodes. The investment decision node identifies an investment decision. The potential investment nodes identify potential investments. The information nodes identify information to be obtained. The information to be obtained is matched to potential investments. Reliability of the information is estimated, for example, with the help of domain experts.

BRIEF DESCRIPTION OF THE DRAWINGS

FIG. 7 is a flowchart illustrating an example of the decision support process in an investment decision context.

DESCRIPTION OF THE PREFERRED EMBODIMENT

Figure 1:
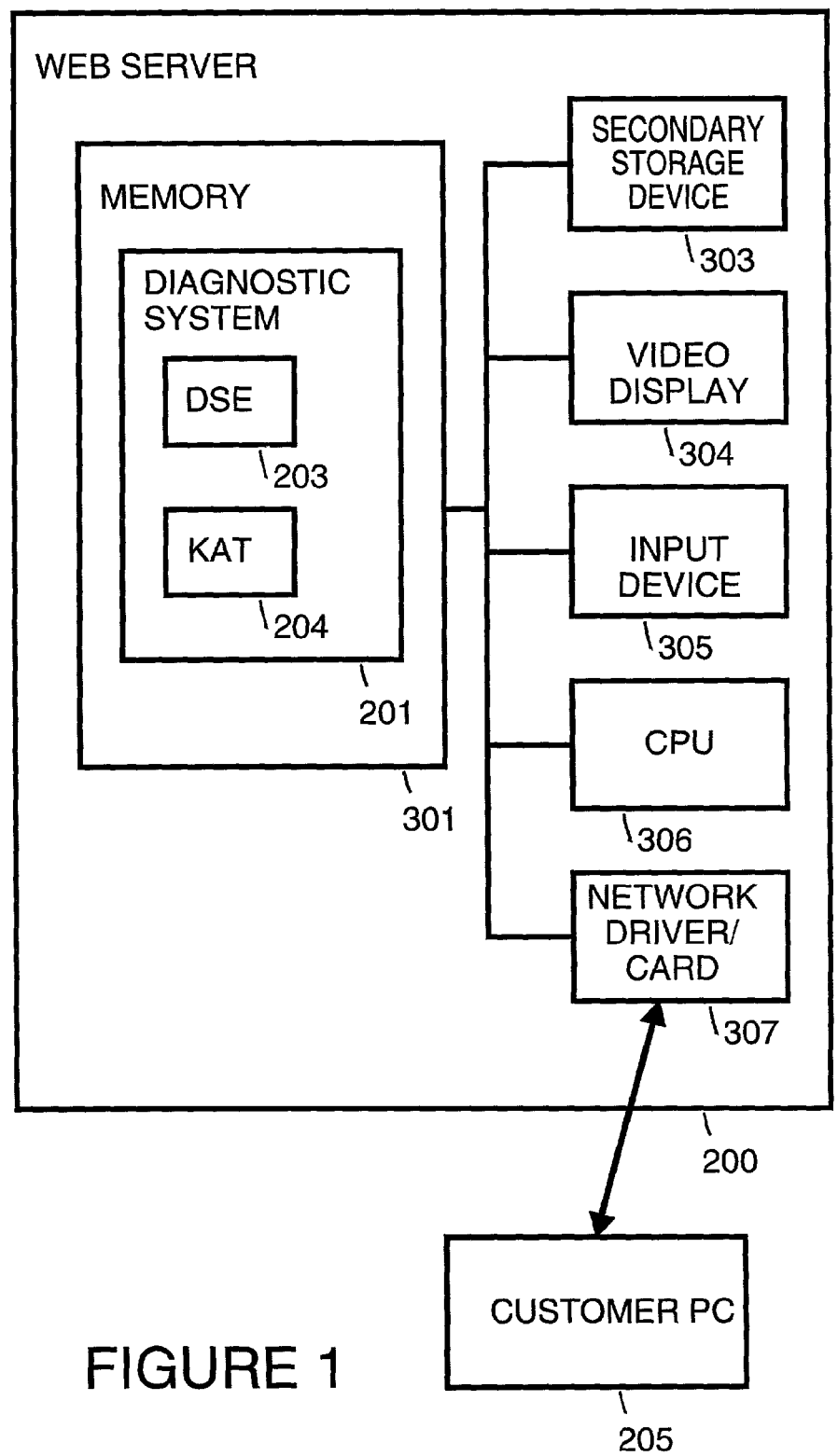
FIG. 1 is a simplified block diagram of a web server in accordance with a preferred embodiment of the present invention.

A diagnostic system is used, for example, for decision support, selection, classification, prediction, and/or brokering.

In decision support, a user is taken through a sequence of questions leading him to the optimal solution to an issue. For example, decision support aids a user in making the right decision with regard to some issue.

To perform knowledge acquisition used to provide decision support, a domain in which to carry out the decision support is identified. Also identified are possible situations within the domain, possible sub-situations of the possible selections and informational steps. The informational steps are matched to the possible situations and the possible sub-situations. Probabilities are estimated for the possible situations the possible sub-situations. Also estimated are probabilities for actions and questions set out in the informational steps and costs for actions and questions set out in the informational steps.

In selection, a diagnostic system runs through a sequence of questions that aids the user in selecting between a number of possibilities. Multiple selections can be made. This is not completely general decision support. It is decision support in the manner that it aids the user to identify the situation that the use is looking at, and then suggests a solution. Causes correspond to situations. Informational steps correspond to diagnostic steps. In this case actions provide solutions, and questions gather information like in a diagnostic system.

To perform knowledge acquisition used to provide selection, a domain in which to carry out the selection is identified. Also identified are possible situations within the domain, possible sub-situations of the possible selections and informational steps. The informational steps are matched to the possible situations and the possible sub-situations. Probabilities are estimated for the possible situations the possible sub-situations. Also estimated are probabilities for actions and questions set out in the informational steps and costs for actions and questions set out in the informational steps. Causes correspond to selections. Informational steps correspond to diagnostic steps and are used to gather information useful for narrowing in on a selection.

In classification, a diagnostic system can be used to classify something according to a number of categories. For example, the diagnostic system can be used for path analysis, e.g., directing customer feedback e-mails to the correct person. Directing customer feedback e-mails to the correct person could entail, for example, classifying an e-mail into one of a number of categories, based on tags or keywords extracted from the e-mail.

In prediction, a diagnostic system can be used to create predictive systems. Basically, potential future causes are modeled instead of current causes, and questions that look for symptoms of future issues are modeled.

Brokering is a variant of selection where a diagnostic system is used to broker among a list of possible solutions. The preferred embodiment of the present invention is a scalable decision support service for securities brokering.

FIG. 1 is a simplified block diagram of a web-server 200. A diagnostic system 201 executes in a memory 301 of web-server 200. Diagnostic system 201 utilizes secondary storage devices 303 for storage of diagnostic models. A video display 304 can be used by a technician to monitor the diagnostic process and to maintain the diagnostic models. Web server 200 also includes an input device 305, such as a keyboard, a CPU 306 and a network card 307 for communication with web-browser 206 in a customer personal computer (PC) 205.

Diagnostics system 201 consists of a decision support engine (DSE) 203 capable of performing efficient and advanced decision support inference and analysis in Bayesian belief networks (BBNs), and a knowledge acquisition tool (KAT) 204 for construction of these decision support models. In the preferred embodiment, diagnostics system 201 is a scalable service allowing thousands of simultaneous users. Diagnostics system 201 can be accessed by e-services, web portals, extensible mark-up language (XML) communicating applications, appliances such as personal digital assistants (PDAs), wireless application protocol (WAP) phones, and so on.

Knowledge acquisition tool 204 is used to construct BBN models for stock brokering issues in order to create a stock brokering service. The BBN models are executed by the decision support engine 203. In alternative embodiments of the present invention, decision support engine 203 can be embedded in standalone applications as a part of a system where stock-brokering models can be utilized by many simultaneous systems or users.

In the preferred embodiment of the present application, diagnostic system 201 allows many different types of clients to utilize the stock-brokering models. Diagnostic system 201 service contains a default user interface that can be modified to suit any style of portal. A portal is a site on the Internet used as an entrance to other sites on the Internet. Also, in the preferred embodiment, diagnostic system 201 has an XML interface that allows applications to communicate directly with it. This makes it even more flexible for users to integrate diagnostic system 201 into their own applications. Also, diagnostic system 201 service allow PDAs, WAP phones to access diagnostic system 201 using their own protocols. For example diagnostic system 201 can be accessed using the wireless mark-up language (WML). PC) 205.

Figure 2:
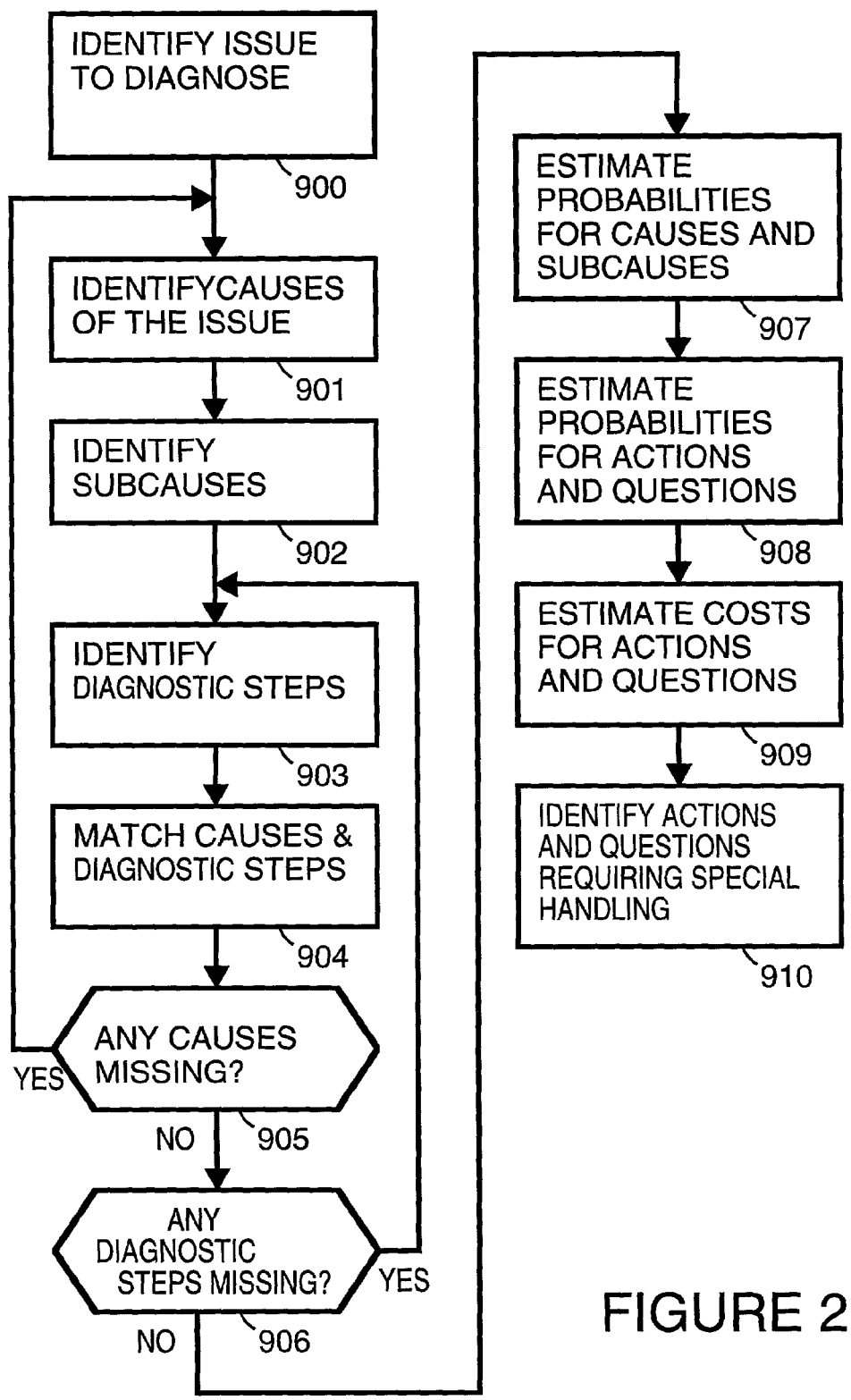
FIG. 2 is an overview of the diagnostic process as it is experienced by the user in accordance with a preferred embodiment of the present invention.

FIG. 2, is an overview of steps to be performed by knowledge acquisition tool 204 in order to implement decision support engine 203. The knowledge acquisition process is the process of constructing the diagnostic models by gathering sufficient information about the domain from so-called domain experts. The domain experts are familiar with the domain that is being modeled, in financial securities. These domain experts have intimate knowledge of the domain under consideration, being experts in the particular area of financial investing. The knowledge acquisition process has to be guided by someone familiar with the rules and requirements of the process. Participating in or guiding the knowledge acquisition process requires no expertise in the area of Bayesian networks.

In the preferred embodiment of the present invention, decision support engine 203 is used to guide investors in investment decisions.

In a step 900, the issues to diagnose are identified. The issue that is being modeled is identified, defined precisely and separated from other issues. Initially, it is very important to precisely define the issue under consideration and the audience of the diagnostic tool, as this will have a large impact on the following knowledge acquisition steps. The skill level of the audience is important when specifying both causes, actions and questions.

For example, causes represent problems with a portfolio or stock selections. Actions represent portfolio recommendations or stock suggestions.

One example of an issue is a diagnosis to make an investment recommendation. In this case, knowledge acquisition tool 204 constructs a Bayesian belief network for execution by decision support engine 203 that allows decision support engine 203 to provide a very simple session that queries an investor on a number of goals and recommends the best single investment that could be made to meet the overall needs of the investor. For example, the investment could be for selection of a mutual fund or a single stock.

Another example of an issue is portfolio troubleshooting. In this case, knowledge acquisition tool 204 constructs a Bayesian belief network for execution by decision support engine 203 that allows decision support engine 203 to perform an analysis of an investor's existing portfolio and to report a number of metrics into a model. The model is prepopulated from the analysis. Decision support engine 203 interviews the investor about problem symptoms. For example, the investor may be uncomfortable with the volatility of the portfolio. Or, the investor might like to see larger returns. Decision support engine 203 recommends the next best steps to address the issue based on belief in the possible causes of the investor's issue. A relatively persistent session can be maintained over time to observe the impact of these changes and to reassess the portfolio or to arrive at a new conclusion about the cause of the issue. Alternatively, the model can be repopulated with new fundamentals, based on executing the recommendation, and the model can decide whether the action improved the situation, proceeding iteratively and automatically, until the best set of recommendations are determined.

For example, the Bayesian belief network constructed by knowledge acquisition tool 204 can be a "supermodel" used for selecting between subservient (sub) models that are good at troubleshooting specific portfolio problems.

Another example of an issue is portfolio selection. In this case, knowledge acquisition tool 204 constructs a Bayesian belief network for execution by decision support engine 203 that allows decision support engine 203 to evaluate a set of predetermined portfolios against investor objectives and a prepopulated model. The prepopulated model includes, for example, the current financial situation of the investor, the age of the investor, and so on. A best portfolio is selected and then a detailed plan is developed to get the investor from the current situation to the new one.

Another example of an issue is a loan advisor. In this case, knowledge acquisition tool 204 constructs a Bayesian belief network for execution by decision support engine 203 that is used to help the investor to decide whether to sell stocks, borrow money, take a home equity loan, et cetera, to raise capital to be used for a particular objective.

Another example of an issue is service selection. In this case, knowledge acquisition tool 204 constructs a Bayesian belief network for execution by decision support engine 203 that allows decision support engine 203 to select from a number of brokerage services, based on the needs of the investor. This is, for example, a "supermodel" that selects among a number of consulting models, providing advice on a wide variety of financial topics. For example, this is used in the selection of a mutual fund for the investor. Alternatively, this is used for the selection of a single stock.

In a step 901, causes of the issue are identified. In this step, the domain experts identify the causes of the issue under consideration. Causes are basically all the different properties or events that can cause the issue.

It is usually impossible and/or not necessary to identify and specify all causes, as there are causes that are too rare to be worth considering. These causes are then gathered in a single leak cause termed "other causes".

One of the difficulties in identifying causes is the decision of whether to group sets of causes as a single cause or whether to keep the causes separate. As a rule of thumb it is easier to do the knowledge acquisition for actions, if causes for which there are different actions are kept separate.

For example, when the issue is stock selection, causes are all the stocks available, for example, on a particular stock exchange. When the issue is portfolio selection, in each of the sub models, causes are, for example, different potential causes of the portfolio problem. For example, potential causes could be too many high-risk stocks, all stocks in same industry sector, and so on. For example, when the issue is portfolio selection, causes correspond to the portfolios under evaluation.

In a step 902, subcauses, if any, are identified. Often, it is convenient to organize causes into categories. These categories are then seen as causes with a number of subcauses. It is not strictly necessary to use subcauses of causes, as it is entirely possible to have all subcauses on the same top level. However, this approach often leads to a high number of causes on the top level, making the acquisition of probabilities more difficult. Organizing the causes into a hierarchy allows the domain expert to consider fewer causes at a time when estimating probabilities, thus providing more accurate information.

While in FIG. 2 there are only represented two levels of the cause-structure in FIG. 2, there can be arbitrarily many levels of causes and subcauses.

In a step 903, diagnostic steps of the issue are identified. Actions that can solve any of the causes of the problem, and questions that can provide information regarding the causes are listed.

When listing the diagnostic steps of a problem, the domain experts basically consider the steps they themselves would perform or suggest for the customer to perform, if they were faced with the problem. Experience shows that it is beneficial to start out listing the steps without considering the previously listed causes, i.e., with a "blank" mind, as this will occasionally bring otherwise forgotten steps into mind. Then, when these first steps have been listed, it is good to consider the list of causes and add all steps that potentially solve these causes.

Again, the domain expert faces the problem of size and coverage of steps. There are diagnostic procedures that can be equivalently modeled as a single step or a series of steps. The rule of thumb here is that it depends on the user interface and the step itself how to represent a step. If the step can be conveniently represented as a deterministic flow-diagram if—then—else structure, and the user interface of the diagnostic system supports the implementation of such deterministic "programs", then the step should be modeled as a single step. If the flow-diagram of the step includes uncertain/probabilistic decisions, the step has to be represented as multiple steps.

There are two main categories of diagnostic steps, actions and questions. The first category, actions, are steps that require the user to perform some kind of intervention in the system, and report back to the diagnostic system whether the action solved the problem or not. Thus, actions have the potential to solve the problem. The second category, questions, are steps that require the user to obtain some information related with the problem at hand possibly by intervening with the system, and report back the result to the diagnostic system. Questions are grouped into two subcategories, information-gathering actions and general questions.

Information—gathering actions are actions that do not have the potential to solve the problem. They merely provide information that is relevant to solving the problem. Ordinary actions are also termed solution actions to distinguish them from the information-gathering actions. It is important to distinguish, as the two types of actions are handled differently in the diagnostic algorithms, as further described below where information-gathering actions are treated as questions. To clarify, this means that algorithmically there is no difference between information—gathering actions and questions. However, the distinction is kept during knowledge acquisition as it is easier for domain experts to elicit probabilities for information-gathering actions if they are treated as actions.

The distinction between information-gathering and solution actions should also be clarified. Solution actions have the potential to solve the problem while information—gathering actions cannot possibly solve the problem. Information-gathering actions only have the potential to temporarily remove the problem while some change to the environment is tried out. General questions are the remaining questions that are not information—gathering actions. Questions do not have the potential to solve the problem, and can have any number of answers as opposed to actions that only have two: yes (it helped) and no (it didn't).

When listing the diagnostic steps of a problem, they must be categorized as either solution actions (SA), information—gathering actions (IA) or questions (Q).

For all actions and questions, explanations should be written as early in the knowledge acquisition process as possible, as these explanations/definitions help to reduce future confusion and ensure that errors are caught as early as possible.

For example, when the issue is investment selection, diagnostic system 201 attempts to determine the characteristics of the investor by use of questions with respect to age, earning power, risk willingness, and so on. Characteristics of the individual stocks such as P/E ratio and capitalization are also represented in the model as questions since the stock market is a dynamic system and these characteristics have to be obtained automatically on a regular basis. The result of the analysis is, for example, a suggestion to purchase a specific stock or set of stocks represented by an action.

When the issue is portfolio selection, the questions pertain to the problem symptoms, for example, portfolio volatility or insufficient rate of return. Questions are both interactive where the investor enters information about the portfolio and automated where information on stocks is gleaned from databases. Actions are recommendations for changes to the portfolio.

In a step 904, causes and diagnostic steps are matched. The diagnostic steps are matched with the causes that they can solve. Additionally, the causes that are associated with questions are identified. In this step, the causes are matched with diagnostic steps such that actions are matched with the causes that they can solve, and questions are matched with the causes that they are associated with (i.e., affect the probabilities of).

For each action, $A_i$, it is considered for each cause, $C_j$, whether there is a non-zero probability that performing $A_i$ will solve $C_j$. If this is so, there is a match which is registered for later use in the knowledge acquisition process.

Information-gathering actions can be handled almost similarly to solution actions. Even though they are not able to solve the problem, they are still able to temporarily remove the problem while trying some change in the environment.

For each question, $Q_i$, it is considered for each cause, $C_j$, whether an answer to $Q_i$ will directly affect the belief in $C_j$ (i.e., cause the probability to decrease or increase).

Questions do not have to affect the beliefs of any causes at all as they are sometimes used to provide information about the diagnostic scenario, user type, etc. to allow/disallow related actions.

In a step 905, a check is made to see if any new causes or subcauses have been identified. These may be identified, for example, when matching the causes and steps. If there are any new causes or subcauses identified, a return is made to step 901.

When matching the actions and questions with the causes that they are associated with, it often happens that causes are discovered for which there are no solution actions, and actions are discovered that cannot solve any causes, i.e., there are respectively actions and causes missing. When this occurs, it is necessary to go back to step 901.

In a step 906, a check is made to see if any new diagnostic steps have been identified, for example, when matching the causes and steps. If there are new diagnostic steps that have been identified, a jump is made back to step 903.

Causes and steps are often forgotten in the initial listing, and new causes and steps are often discovered when matching causes with steps. Therefore, it is optimal to perform the matching of causes and steps before eliciting the probabilities for causes, as this elicitation has to be performed partly over again each time a new cause is discovered.

In a step 907, probabilities of causes and subcauses are estimated. When there is a high degree of certainty that all causes have been listed, and causes and subcauses have been structured in a hierarchy, the probabilities of causes should be estimated. This is usually done bottom-up, so that the probabilities of subcauses given the cause are estimated first, and then the probabilities of causes given the problem.

The probabilities of subcauses are estimated first. The sets of subcauses are visited in sequence, such that a separate elicitation of probabilities is performed for each set of subcauses of the same cause. The probabilities of the subcauses are elicited assuming that the problem is present and the cause is present. When all probabilities of subcauses have been elicited, the probabilities of the causes are elicited, assuming that the problem is present.

Experience has shown that this method of probability elicitation where the probabilities are basically elicited against the causal direction (the subcauses cause the causes, and the causes cause the problem) is highly efficient as it provides the domain experts with maximum information to base their probabilities on as they are allowed to assume that the problem and/or the cause is present.

The usual procedure of eliciting the probabilities of a set of causes/subcauses is for one domain expert to give initial probabilities to most of the causes given the higher level cause—or at least a ranking (this is the highest, this is the next highest, etc.). Then the domain experts discuss the initial probabilities or rankings and adjust as a result of discussions. When final agreement is reached, the elicitation is closed.

Obviously, there is always some amount of second-order uncertainty on the elicited probabilities. One standard method of representing this second-order uncertainty is to use probability intervals such that the domain expert states his/her belief that the probability is within a certain interval. When the domain experts have then agreed on a specific interval, there are methods that allows propagation of probability intervals in Bayesian networks. Rendering the second-order uncertainty explicit allows the domain expert to specify different size probability intervals for different probabilities, and the automated diagnostic system would be able to give its conclusions with the appropriate uncertainty.

In step 908, probabilities of actions and questions are estimated.

In the preferred embodiment, there are two types of questions, those that pertain to symptoms or effects of causes, and general questions that are not naturally seen as a symptom or an effect. The knowledge acquisition processes for the two types of questions are different, so it is important to determine the type of the question before eliciting the probabilities for it. The difference between these two types of questions is further elaborated below.

For general questions, the causes associated with the question, have been previously listed, i.e., the causes that will have their probabilities decreased or increased depending on the answer to the question. For this type of questions, the domain experts consider each answer to the question (e.g., yes, no, etc.) and estimate how much the probabilities of the affected causes will decrease or increase based on the new information. The elicitation proceeds much like the one for causes—there can be disagreements in understanding that have to be solved by discussions.

The domain experts focus on the causes that are affected by the answer to the question, thus the probabilities of causes that are not affected, are not modified by the experts. However, the fact that other causes are having their probabilities increased or decreased will cause the probabilities of the remaining to change accordingly, such that the sum is still 1.0. It is clearly easier for the experts to only adjust the probabilities that are directly affected, and then let the rest change accordingly, than having the experts assess the changes in all probabilities. Also, it was the experience that the experts were comfortable with letting the remaining probabilities change accordingly.

Also, for general questions the domain experts have to give prior probabilities for the answers to the question. It will be explained below how to check whether the experts have specified inconsistent information for general questions by analysing the unconditioned probability of the associated causes, $P(C)$, the conditional probability, $P(C|Q)$, and the priors on the question $P(Q)$, i.e., by comparing $\Sigma_Q P(C|Q) P(Q)$ with $P(C)$.

For questions about symptoms, the causes that are associated with the question are listed in step 904, shown in FIG. 2 and described above, that is, the causes that cause the symptom in question. Here, the elicitation consists of giving for each of the associated causes, the probability of the symptom given the cause. Also, the probability that the symptom appears if none of the specified causes are present should be estimated.

In a step 909, costs of actions and questions are estimated. In the diagnostic algorithms, it is necessary to know the cost of performing actions and questions to be able to determine which is the optimal step to perform next. The cost can either be estimated as a single factor, or as a combination of multiple factors. As the cost really is composed of multiple significant factors, it seems to be the most reliable and accurate approach to assess each of these factors separately, and then combine the factors into a single cost factor. The cost is composed of many factors.

For example, costs can include estimated price volatility, investment liquidity, transactions costs, minimum investment requirements, amount of time required to monitor/service an investment, and so on.

There are several other factors of cost that can be considered such as the inconvenience in purchasing and selling an investment.

The cost factors must be combined into a single figure to be useful for the diagnostic algorithms. To do this,all cost factors for investements must be converted to numbers, and finally the cost factors must be balanced and added. To determine how to do this, experiments can be performed with the domain experts asking them to rank steps which differ on cost factors. From a sufficient amount of such experiments, the conversion factors and weights can be determined.

In a step 910, actions and questions requiring special handling are identified and dealt with.

There are several pieces of additional information that it is necessary to specify for the diagnostic model to get a diagnostic system that performs as desired. These are collectively referred to as actions and questions requiring special handling.

Figure 3:
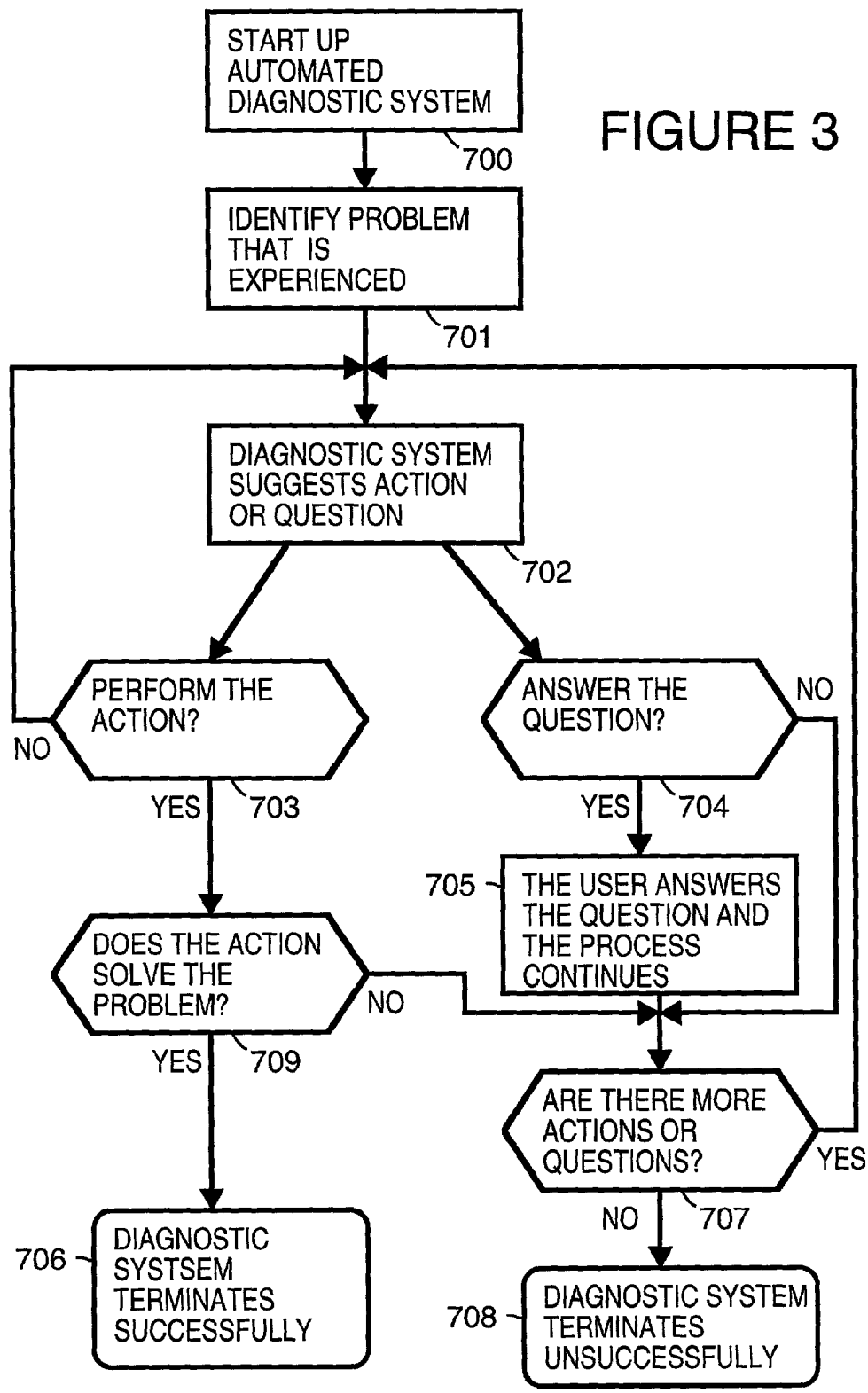
FIG. 3 is an overview of steps to perform knowledge acquisition in accordance with a preferred embodiment of the present invention.

FIG. 3 is an overview of the diagnostic process as it is experienced by the user. In a step, the diagnostic system is initiated by the user, either through a world wide web user interface or as a stand alone executable on the user's own computer. In a step 701, the user interface guides the user to an identification of the issue to be solved. This can be done in several ways, menu systems, graphical pictures and so on. In a step 702, the user now enters the main loop of the diagnostic system, where the diagnostic system first suggests either an action or a question and the user then responds to this (possibly after performing some sequence of actions) The diagnostic system also may go out on the Internet or use other resources to determine pertinent information such as current information pertaining to a particular investment. In a step 703 and a step 704, the user can choose not to perform the suggestions.

After the user has performed an action, he inputs to the diagnostic system, in a step 709, whether or not the action solved the problem (issue). If the action solved the problem, the diagnostic system terminates successfully in step 706, but if the action does not solve the problem, the diagnostic system has to check, in step 707, whether there are any remaining actions or questions that have not been suggested. If there are no remaining steps, the diagnostic process, in step 708, is terminated unsuccessfully. No resolution of the problem could be found. If there are remaining actions or questions, the diagnostic process, in step 702, is continued. Similarly, if the diagnostic system has suggested a question, the user may decide, in step 704, not to perform the question. Alternatively, in step 705, the user answers the question and the process continues. In step 707 a check is made as to whether there are any more actions or questions that have not been asked.

Figure 4:
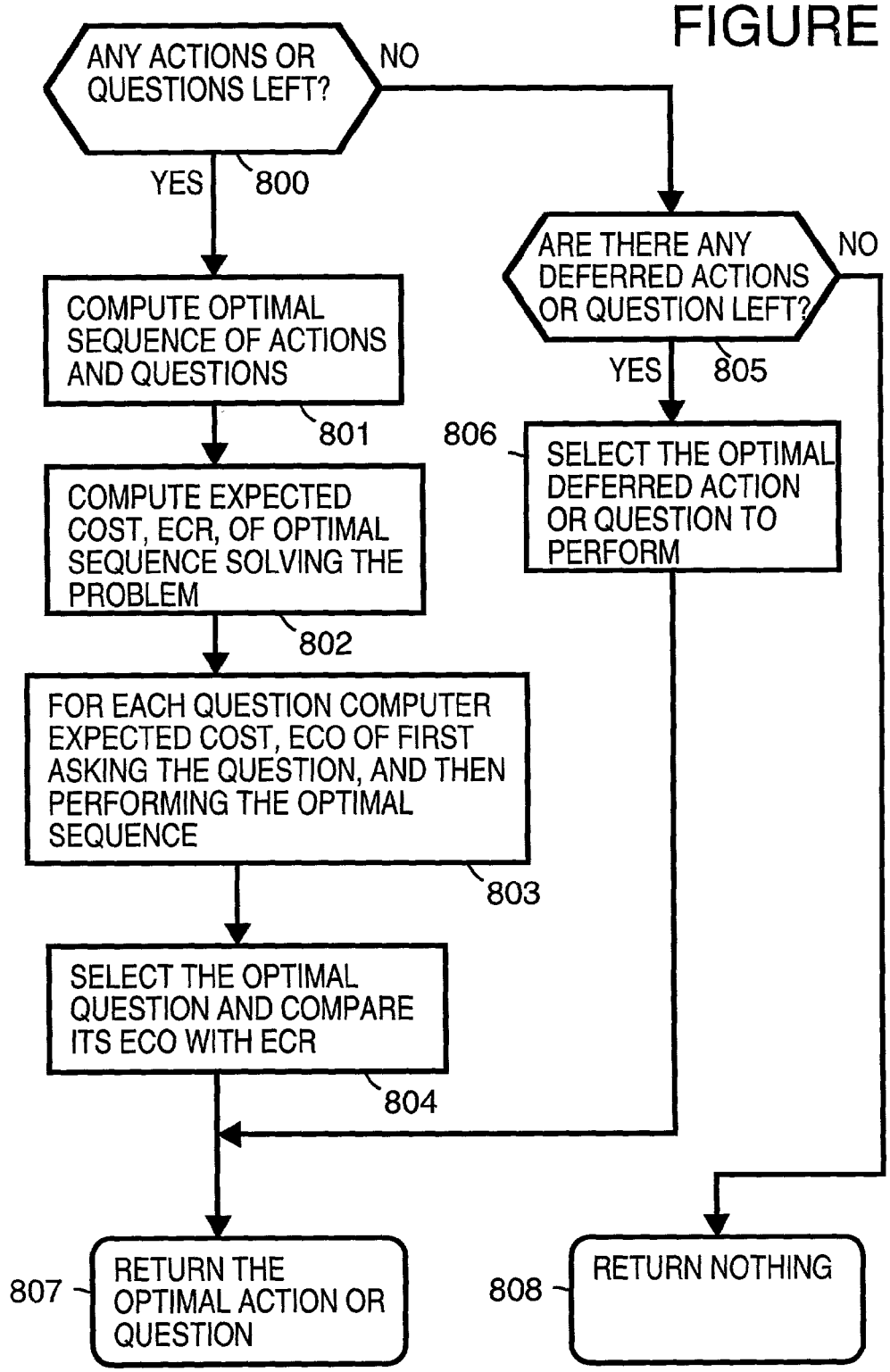
FIG. 4 is an overview of the process of selecting the best next step to perform in accordance with a preferred embodiment of the present invention.

FIG. 4 is an overview of the process of selecting the best next step to perform. FIG. 4 basically covers the substeps performed to implement step 702 and step 707 shown in FIG. 3. In a step 800, a check is made as to whether there are any actions or questions left that have not been suggested yet. If there aren't any left, in a step 805, it is checked whether there are any actions or questions left that have been deferred earlier. If this is the case, in a step 806, the best of these is selected and a return is made in step 807. If there are no deferred actions or questions either, in step 808, nothing is returned, as everything has been tried and there is nothing else to suggest.

If in step 800, it is found that there are still actions or questions left that have not been suggested yet, in step 801 there is computed the optimal sequence of actions and questions. In a step 802, the expected cost (ECR) of executing this optimal sequence until the cause is identified. In a step 803, for each question, there is computed the expected cost (ECO) of first asking the question and then performing the optimal sequence of actions given the answer to the question. In a step 804, the ECO for each question is performed with the ECR of the optimal sequence to see whether there is a question that it is optimal to ask before performing the optimal sequence of actions. The optimal action or question is then finally returned in step 807.

Figure 5:
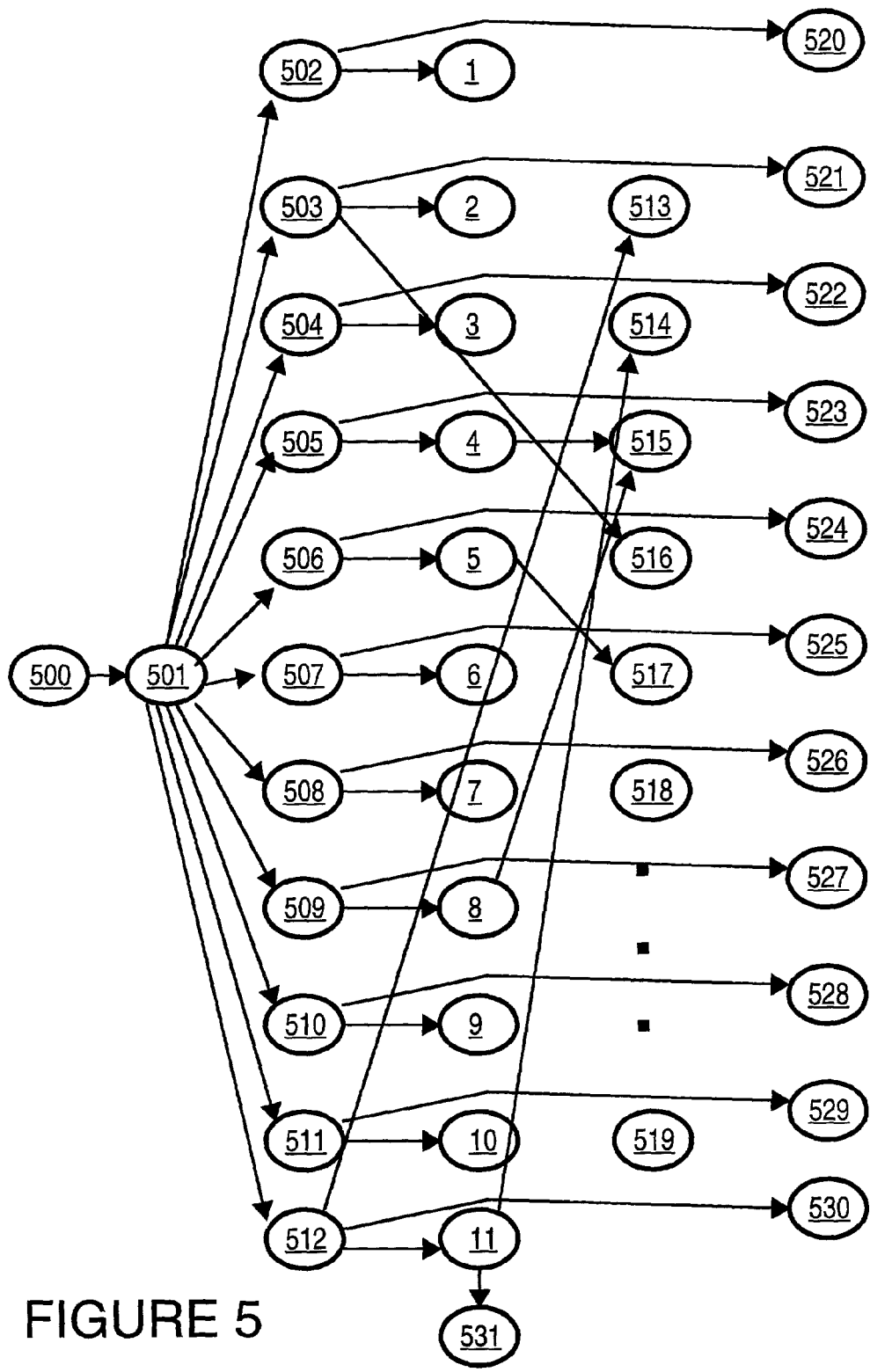
FIG. 5 shows an example of a Bayesian network built by a knowledge aquisition tool and used by a decision support engine in accordance with a preferred embodiment of the present invention.

FIG. 5 shows an example of a Bayesian network built by knowledge aquisition tool 204 and used by a decision support engine 203 in accordance with a preferred embodiment of the present invention.

The Bayesian network includes a brokering issue node 500, overall causes node 501. Overall causes node 501 includes cause nodes 502, 503, 504, 505, 506, 507, 508, 509, 510 and 511. The Bayesian network also includes a flow node 1, a flow node 2, a flow node 3, a flow node 4, a flow node 5, a flow node 6, a flow node 7, a flow node 8, a flow node 9, a flow node 10, a flow node 11 and an output node 531. Flow node 1 is also referred to as flow 1. Flow node 2 is also referred to as flow 2. And so on. Nodes 513, 514, 515, 516, 517, 518 and 519 are diagnostic steps nodes. The last column in FIG. 7 contains the subcause nodes 520, 521, 522, 523, 524, 525, 526, 527, 528, 529 and 530. Each of the subcause nodes 520–530 represents a Bayesian network modeling the subcauses of the cause.

Figure 6:
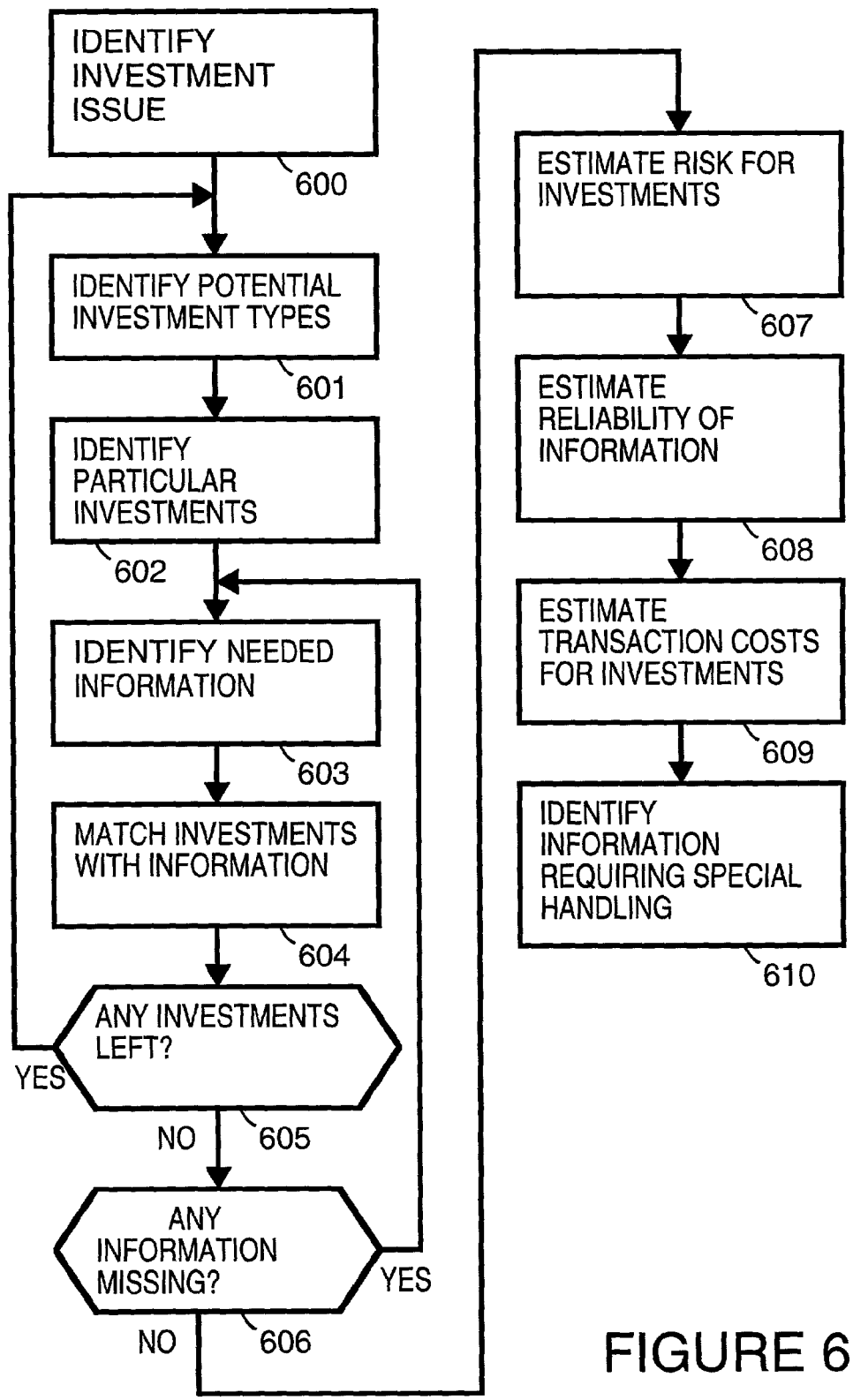
FIG. 6 is a flowchart illustrating an example of the diagnostic process in an investment decision context.

For example, the brokering issue may have to do with the selection of a new investment for an investor. The causes can represent investment types such as stocks on a particular stock exchange, bonds, stock mutual funds, bond mutual funds, real estate funds, and so on. The subcauses represent, for example, potential individual investment within an investment area. Diagnostic steps include, for example, information gathering about an investor for information such as investment time horizon, risk toleration, desired return, available capital, other investments and so on. Diagnostic steps can also include, for example, information gathering about an investment such as, for example, price fluctuations, price/earnings ratio, investment managers, company officers and so on. Flow nodes represent flows in the interaction between the investor and decision support engine 203. This brokering issue example is illustrated by FIG. 6 and FIG. 7 discussed below.

In FIG. 5, the arcs are directed from the issue towards the causes and the subcauses are against the causal direction. However, the arcs can be reversed if necessary, for representing, e.g., persistence. This direction for the arcs is used herein because the specification of probabilities becomes easier.

The conditional probability distribution for causes node 501 is as set out in Table 1 below:

TABLE 1

| Causes 501 states | Brokering issue 500 states | |
|---|---|---|
| | yes | no |
| Cause 502 | $x_1$ | 0 |
| Cause 503 | $x_2$ | 0 |
| Cause 504 | $x_3$ | 0 |
| Cause 505 | $x_4$ | 0 |
| . . . | . . . | 0 |
| Cause 512 | $x_{11}$ | 0 |
| N/A | 0 | 1 |

All the x's in Table 1 represent probabilities; for each cause the probability that it is the cause of the issue (e.g., a suitable investment choice for the investment decision). From the knowledge acquisition process defined above, a probability distribution over the causes in the issue is obtained which is then used directly in the above probability distribution.

Cause nodes 502, 503, 504, 505, 506, 507, 508, 509, 510, 511 and 512 represent investment areas suitable for the investment decision. Cause nodes 502 through 512 each have two states, yes and no. For example, "cause node" 502 has conditional probability distribution as set out in Table 2 below:

TABLE 2

| | Cause 501 states | | | | |
|---|---|---|---|---|---|
| Cause 502 states | Cause 502 | Cause 501 | . . . | Cause 512 | N/A |
| yes | 1 | 0 | 0 | 0 | 0 |
| no | 0 | 1 | 1 | 1 | 1 |

In Baysian network shown in FIG. 5, there are two levels of diagnostic steps. The first level of diagnostic steps are global diagnostic steps that are used to determine causes (e.g., investment types). The next level of diagnostic steps are local diagnostic steps that determine subcauses (e.g., particular securities within an investment type).

The global diagnostic steps 513, 514, 515, 516, 517, 518 and 519 are associated with some of the cause nodes 502–512 and/or some of the flow nodes. For example, global diagnostic step 513 is associated with "Flow 5"and cause node 512. This is modeled with the following conditional probability distribution for node 513, as set out in Table 3 below:

TABLE 3

| "Flow 5" states | | ok | | lost | |
|---|---|---|---|---|---|
| Cause 512 states | yes | no | yes | no |
| 513 states | yes | 0 | 1 − ϵ | 0 | 0 |
| | no | 1 | ϵ | 1 | 1 |

There is a probability (ϵ) that cause 512 is not able to solve the issue (e.g., purchasing or selling an investment does not satisfy the criteria of the investment decision). The probability ϵ is referred to as the inaccuracy of the action.

For the brokering implementation discussed above, FIG. 6 and FIG. 7 show how the processes set out in FIG. 2 and FIG. 3 are modified to accomplish this type of decision making.

FIG. 2, is an overview of steps to be performed by knowledge acquisition tool 204 in order to implement decision support engine 203. As described above, the knowledge acquisition process is the process of constructing the models by gathering sufficient information about the domain from so-called domain experts. The domain experts are familiar with the domain that is being modeled, in financial securities. These domain experts have intimate knowledge of the domain under consideration, being experts in the particular area of financial investing. The knowledge acquisition process has to be guided by someone familiar with the rules and requirements of the process. Participating in or guiding the knowledge acquisition process requires no expertise in the area of Bayesian networks.

In a step 600, the investment issue is identified. In this case the issue is selecting one or more investments that are appropriate to an investor.

In a step 601, investment types are identified. In this step, the domain experts identify the types of information that could be used by an investments. Investment types could be broad categories, such as "real estate", "stocks", "bonds", "precious metals". Alternatively, investment types might be sectors within the stock market. Investment types also could be different types of mutual funds such as "small capitalization value stock funds", or "mid cap growth funds".

In a step 602, individual investments within investment types are identified. For the case of "small capitalization value stock funds" this could include all mutual funds that currently invest in small capitalization stocks based on a value investment style. Particular investments that, according information available in the system, have the best potential are investigated further.

While in FIG. 6 there are only represented two levels of the investment structure in FIG. 2, there can be arbitrarily many levels of investments. For example, at a first level may be investment type (real estate, stocks, bonds, mutual funds etc). At a second level may be categories within investment types. For example within stocks there may be several categories (small capitalization value stocks, small capitalization growth stocks, mid capitalization value stocks, mid capitalization growth stocks, large capitalization value stocks, large capitalization growth stocks). At the same level or at a lower level, stocks may be further divided into sector categories (e.g., financial stocks, technology stocks, utilities, etc.). At the lowest level may exist individual stocks.

In a step 603, needed information is identified about selected potential investments are identified. This information will be obtained from databases with information on the investments and/or from the potential investor.

As discussed above, questions to be asked of the potential investor may be to determine the characteristics of the investor with respect to age, earning power, risk willingness, and so on. Current information to be obtained from databases includes, for example, projected earnings, potential growth rates, P/E ratio, capitalization and so on if the potential investment is a stock. For bonds the information may include, for example, current rate of return, bond rating, time to maturity, and so on.

In a step 604, individual investments are matched with information to be used to evaluation the information. This information is selected by domain experts based on information that is needed to determine what investments best meet particular investor profiles.

In a step 605, a check is made to see if additional investments need to be evaluated. If so, a return is made to step 601.

In a step 606, a check is made to see if any new information is needed to make a decision. When matching required information to investments, it may become clear that enough information will not be available to assure that a potential investment will or will not meet investor criteria. When this occurs, a jump is made back to step 603.

In a step 607, investment risks are identified. Risks of investment types as well as particular investments are calculated. These risks can be based on information obtained directly from the domain experts. Alternatively, the domain exports can point to historical data or other data to be used to calculate risks based or formulas supplied by the domain experts.

In step 608, the reliability of information is estimated. This is especially necessary when the information is based on future projections, such as projected earnings and projected growth rates. This reliability can be based on information obtained directly from the domain experts. Alternatively, the domain exports can point to historical data or other data to be used to calculate reliability based or formulas supplied by the domain experts.

In a step 609, transaction costs of the investments are calculated. This includes, for example, brokerage costs. This can also include an estimate of costs based on illiquidity of certain types of investments. Again this information is supplied by domain experts or based for formulas supplied by the domain experts to be used with current data supplied by financial or other databases.

In a step 610, information requiring special handling is identified and dealt with.

The use of domain experts to construct Bayesian networks as described above provides a significant advantage over systems that just provide screening for stocks. The use of expertise of domain experts, for example, to provide estimates of investment risk and/or reliability of information, etc. Allows the decision support system to reflect the decision making process of experts. Continual updating of information obtained from domain experts can further increase the usefulness of the systems based on preferred embodiments of the present invention.

FIG. 7 is an overview of the decision support process as it is experienced by the user. In a step 720, the decision support system is initiated by the user, either through a world wide web user interface or as a stand alone executable on the user's own computer. In a step 721, the user interface guides the user to an identification of the investment issue to be solved. This can be done in several ways, menu systems, graphical pictures and so on. In a step 722, the user now enters the main loop of the decision support system, where the decision support system first obtains information from the user (step 724) and obtains information from investment data bases (step 723). The decision support system may go out on the Internet or use other resources to determine pertinent information such as current information pertaining to a particular investment.

In step 723 a determination is made as to whether additional information is needed for a recommendation. If yes, the decision support system returns to step 722. If in step 723 no additional information is made for a recommendation, in a step 729, a recommendation to the user is made who has the opportunity to accept the recommendation or hold out for another recommendation. If the user accepts the recommendation, in a step 726, the decision support system terminates successfully.

In step 724, the user can choose not to answer a question. The decision support system receives the answer in step 725. In a step 727 a determination is made as to whether additional information is needed for a recommendation. If yes, the decision support system returns to step 722. If in step 727 no additional information is made for a recommendation, in step 729, a recommendation to the user is made who has the opportunity to accept the recommendation or hold out for another recommendation. If the user does not accept the recommendation, step 727 can be repeated, or when a loop between step 727 and step 729 occurs, the decision support system is terminated without a recommendation in a step 730.

This can map for the Bayesian network shown in FIG. 5, for example, as follows. Node 500 is an investment issue node. Node 501 is an overall investment node. Nodes 502, 503, 504, 505, 506, 507, 508, 509, 510 and 511 are investment type nodes. Flow nodes 1 through 11 and nodes 513, 514, 515, 516, 517, 518 and 519 are information gathering nodes. Nodes 520, 521, 522, 523, 524, 525, 526, 527, 528, 529 and 530 are particular investment nodes.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for using a Bayesian network to diagnose an issue in a stock brokering domain, the method comprising:
    displaying via a user interface one or more questions for guiding a user to identify at least one issue in the stock brokering domain to be solved by traversing questions connected within the Bayesian network responsive to answers to the questions;
    responsive to identifying the at least one issue, identifying a cause connected via at least one directed edge in the Bayesian network with the identified issue;
    traversing at least one directed edge from the identified cause to an action in the Bayesian network;
    displaying via the user interface the action for the user to perform; and
    responsive to the user having performed the action, receiving user input indicating whether or not the action solved the issue.

2. The method of claim 1 further comprising:
    responsive to the action not solving the identified issue, determining an optimal sequence of one or more actions from a set of actions connected in the Bayesian network to the identified cause which have not already been performed; and
    computing an expected cost of executing the optimal sequence.

3. The method of claim 2 further comprising:
    computing an expected cost of first asking a question from a set of questions which have not already been answered and the cost of performing the optimal sequence of actions given an answer to the question.

4. A system for using a Bayesian network to diagnose an issue in a stock brokering domain, the system comprising:
    means for displaying via a user interface one or more questions for guiding a user to identify at least one issue in the stock brokering domain to be solved by traversing questions connected within the Bayesian network responsive to answers to the questions;
    responsive to identifying the at least one issue, means for identifying a cause connected via at least directed edge in the Bayesian network with the identified issue;
    means for traversing at least one directed edge from the identified cause to an action in the Bayesian network;
    means for displaying via the user interface the action for the user to perform; and
    responsive to the user having performed the action, means for receiving user input indicating whether or not the action solved the issue.

* * * * *